United States Patent [19]

Kruggel

[11] 3,882,326

[45] May 6, 1975

[54] DIFFERENTIAL AMPLIFIER FOR SENSING SMALL SIGNALS

[75] Inventor: Robert Henry Kruggel, Jericho, Vt.

[73] Assignee: International Business Machines Corporation, Armonk, N.Y.

[22] Filed: Dec. 26, 1973

[21] Appl. No.: 428,591

[52] U.S. Cl. ............. 307/235 R; 307/238; 307/304; 340/173 DR; 340/173 CA

[51] Int. Cl. ..... H03k 5/20; G11c 11/24; H03k 5/18

[58] Field of Search ........ 307/235 R, 238, 289, 279; 328/146; 340/173 AM, 173 DR, 173 FF, 173 SP, 173 CA; 330/14, 30 D, 82

[56] References Cited

UNITED STATES PATENTS

| | | | |
|---|---|---|---|
| 3,588,844 | 6/1971 | Christensen | 307/238 X |
| 3,668,429 | 6/1972 | Ainsworth | 307/235 R |
| 3,676,704 | 7/1972 | Donofrio et al. | 307/235 R |
| 3,760,194 | 9/1973 | Lutz et al. | 307/235 R |
| 3,774,176 | 11/1973 | Stein et al. | 340/173 DR UX |
| 3,806,898 | 4/1974 | Askin | 340/173 DR |
| 3,838,295 | 9/1974 | Lindell | 307/238 |
| R27,305 | 3/1972 | Polkinghorn et al. | 307/251 |

OTHER PUBLICATIONS

Henle, "N-Way Priority Circuit," IBM Tech. Discl. Bull., Vol. 13, No. 10, pp. 2824–2825, 3/1971.

Burke et al., "Memory Cell Differential Amplifier," IBM Tech. Discl. Bull., Vol. 13, No. 5, pp. 1281–1282, 10/1970.

Weidman, "Restore Circuitry for Bit/Sense System," IBM Tech. Discl. Bull., Vol. 13, No. 6, pp. 1705–1706, 11/1970.

*Primary Examiner*—Michael J. Lynch
*Assistant Examiner*—L. N. Anagnos
*Attorney, Agent, or Firm*—Stephen J. Limanek

[57] ABSTRACT

A differential amplifier providing high gain and capable of handling small signals has a common constant current source to which two parallel branches or circuits are connected. Each of the branches includes a controlled current source and an input dependent current source, such as a field effect transistor, coupling the common source to the controlled current source, with a capacitor connected to the common point between the controlled current source and the input dependent current source for providing an alternating current signal to a feedback circuit of the amplifier for latch operation. Differential input voltages are applied to the input dependent current sources from a pair of bit lines of a memory array. Differential output voltages are derived from the two common points between the controlled current sources and the input dependent current sources.

17 Claims, 2 Drawing Figures

DIFFERENTIAL AMPLIFIER FOR SENSING SMALL SIGNALS

CROSS REFERENCE TO RELATED APPLICATION

Commonly assigned co-pending application having Ser. No. 426,845, filed on Dec. 20, 1973 by Robert H. Kruggel and entitled "High Gain Amplifier."

FIELD OF THE INVENTION

This invention relates to an amplifier, having a latch operation, which is responsive to small signals and provides a high gain. Such amplifiers are often desired as sense amplifiers for detecting during a memory read operation small signals derived from very small cells which form highly dense memory arrays in integrated circuit chips or wafers and for restoring amplified signals into appropriate cells. Since high density is an important factor in producing desirable memory arrays, the surface area on a chip or wafer which is utilized by the sense amplifiers should be as small as possible without sacrificing the gain required from these amplifiers.

DESCRIPTION OF THE PRIOR ART

Various amplifiers for memory arrays have been provided in an attempt to satisfy the many requirements imposed upon amplifiers to be used in the environment of, e.g., highly dense memory arrays formed in semiconductor chips or wafers, such as the memory arrays described in commonly assigned U.S. Pat. No. 3,387,286. One type of amplifier used in integrated circuits has a pair of cross-coupled field effect transistors. This type amplifier operates satisfactorily for some applications but this amplifier will not operate until a relatively high input signal is applied thereto. Such an amplifier is disclosed, e.g., in U.S. Pat. No. 3,588,844. A second type of amplifier is a differential amplifier as disclosed in IBM Technical Disclosure Bulletin, Vol. 13, No. 2, July 1970, pages 484 and 485, which employs a constant current source connected to one end of two parallel circuits, with a common voltage source connected at the other end of the parallel circuits. A first pair of bipolar transistors, one transistor in each of the parallel circuits, has a common emitter connection to the constant courrent source and a second pair of bipolar transistors are used as the load for the first pair. This conventional differential amplifier employing a constant current source and a common voltage source interconnected by two parallel circuits may also utilize field effect transistors for some applications, but not where high gain is required. These field effect transistor differential amplifiers have a gain which is highly dependent upon the width to length ratio of the field effect transistors and are process limited. Typically they provide a gain of from 5 to 10. Another type of differential amplifier is described in U.S. Pat. No. 3,317,850. This latter type employs field effect transistors with load resistors which are difficult to fabricate in field effect transistor technology.

SUMMARY OF THE INVENTION

Accordingly, it is an object of this invention to provide an amplifier circuit which detects very small signals and has a very high gain.

It is another object of this invention to provide an amplifier, simple in construction, which is readily produced in integrated circuit environments having a very high density of circuits.

Yet another object of this invention is to provide an improved high gain amplifier which can be produced by employing conventional insulating gate field effect transistor technology processes.

A further object of this invention is to provide a differential amplifier for memory arrays having very high gain for small signals which can be operated as a latch.

Still another object of this invention is to provide a high gain differential amplifier utilizing field effect transistors which can be operated as a latch.

These and other objects of the invention are obtained by providing a high gain amplifier with a feedback circuit for latch operation. The amplifier has a common constant current source and a common voltage source interconnected by a pair of parallel circuits each having a controlled current source serially connected to an input dependent current source, with a capacitor connected to each of the parallel circuits at the common point between the controlled current source and the input dependent current source for providing an alternating current signal to a feedback circuit of the amplifier for latch operation. Differential input signals are applied to control electrodes of the input dependent current source.

The foregoing and other objects, features and advantages of the invention will be apparent from the following more particular description of the preferred embodiment of the invention, as illustrated in the accompanying drawing.

DESCRIPTION OF THE PREFERRED EMBODIMENT

Figure 1:
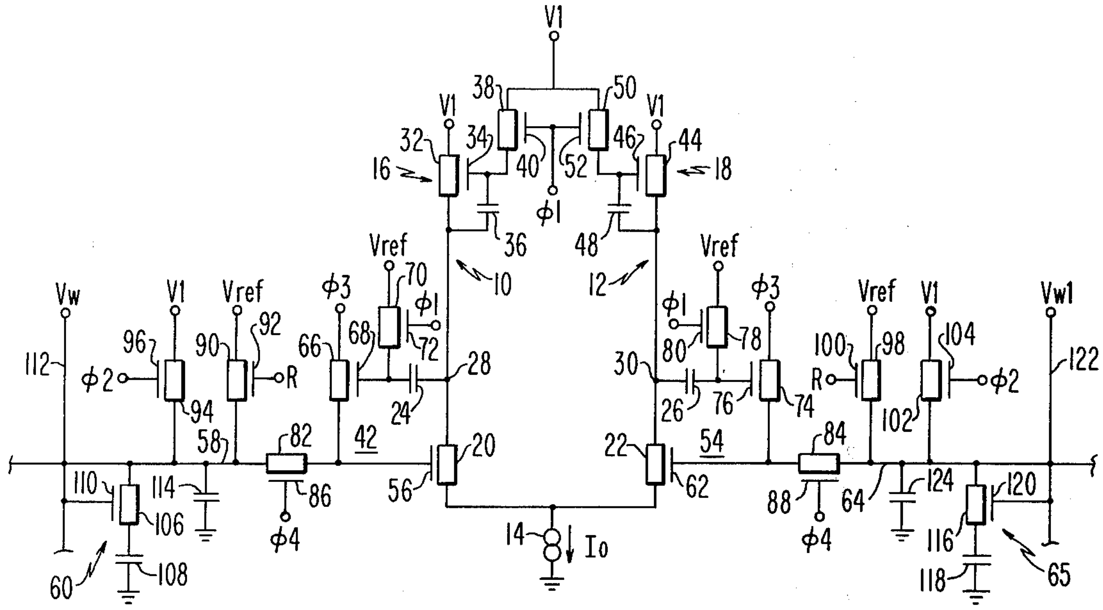
FIG. 1 is a circuit diagram of the amplifier of the present invention shown coupled to memory cell circuits and FIG. 2 is a pulse program for operating the circuit illustrated in FIG. 1.

Referring now to the drawing in more detail, as shown in FIG. 1, an embodiment of the amplifier of the present invention includes first and second parallel circuits 10 and 12 coupled at one end to a common constant current source 14 and at the other end to a common voltage source indicated as V*l*. The parallel circuits 10, 12 each include a controlled current source 16, 18 and an input dependent current source, shown as field effect transistors 20 and 22, serially connected with the controlled current sources 16 and 18. At the common point 28 between controlled current source 16 and transistor 20 in circuit 10 there is coupled one plate of a capacitor 24 of feedback circuit 42 and at the common point 30 between the controlled current source 18 and the transistor 22 in circuit 12 there is connected one plate of a capacitor 26 of feedback circuit 54. The controlled current source 16 includes a field effect transistor 32 connected between V*l* and common point 28 and having a gate electrode 34 connected to one plate of a capacitor 36 with the other plate of the capacitor 36 being connected to common point 28. Voltage source V*l* is also coupled to the gate electrode 34 of transistor 32 through a transistor 38 having a gate electrode 40. The controlled current source 18 in circuit 12 includes a field effect transistor 44 connected between voltage source V*l* and common point 30 and having a gate electrode 46 connected to one plate of a capacitor 48 with the other plate of the capacitor 48 being connected to common point 30. The voltage source V*l* is also coupled to the gate electrode 46 of transistor 44 through a transistor 50 having a gate electrode 52. The clock pulse source $\phi 1$ is also connected to the gate electrode 52 of transistor 50. Input signals to the amplifier are applied to the gate electrode 56 of transistor 20 from a bit line 58 coupled to one or more memory cells of a memory array, as indicated at 60 and to gate electrode 62 of transistor 22 from a bit line 64 coupled to one or more memory cells, such as cell 65, of the array.

The feedback circuit 42 includes, in addition to capacitor 24, a field effect transistor 66 having a gate electrode 68 coupled to the common point 28 through capacitor 24. A clock pulse source $\phi 3$ is coupled to the gate electrode 56 of transistor 20 through transistor 66. A voltage source Vref is coupled to the gate electrode 68 of transistor 66 through a field effect transistor 70 having a gate electrode 72 to which is connected clock pulse source $\phi 1$.

The feedback circuit 54 includes, in addition to capacitor 26, a field effect transistor 74 having a gate electrode 76 coupled to the common point 30 through capacitor 26. The clock pulse source $\phi 3$ is coupled to the gate electrode 62 of transistor 22 through transistor 74. The voltage source V*ref* is coupled to the gate electrode 76 of transistor 74 through a field effect transistor 78 having a gate electrode 80 to which is connected clock pulse source $\phi 1$.

The bit lines 58 and 64 are connected to gate electrode 56 of transistor 20 and gate electrode 62 of transistor 22 through field effect transistors 82 and 84, respectively, having gate electrodes 86 and 88 to which clock pulse source $\phi 4$ is connected.

Means for applying operating voltages to bit line 58 includes field effect transistors 90 having gate electrodes 92 coupling voltage source V*ref* to bit line 58. A restore pulse source R is connected to gate electrode 92. A field effect transistor 94 having a gate electrode 96 couples voltage source V*l* to bit line 58. A clock pulse source $\phi 2$ is connected to the gate electrode 96. Means for applying operating voltages to bit line 64 includes field effect transistor 98 having a gate electrode 100 coupling voltage source V*ref* to bit line 64. The restore pulse source R is connected to the gate electrode 100. A field effect transistor 102 having a gate electrode 104 couples voltage source V*l* to bit line 64. The clock pulse source $\phi 2$ is connected to the gate electrode 104.

Memory or storage cell 60 connected to bit line 58 includes a field effect transistor 106 coupling a storage capacitor 108 to bit line 58. The gate electrode 110 of transistor 106 is connected to a word line 112 which is coupled to a work pulse source V*w*. The capacitance of the bit line 58 is indicated at 114. Memory or storage cell 65 connected to bit line 64 includes a field effect transistor 116 coupling a storage capacitor 118 to bit line 64. The gate electrode 120 of transistor 116 is connected to a word line 122 which is coupled to word pulse source V*wl*. The capacitance of the bit line 64 is indicated at 124. A more detailed description of memory arrays utilizing one-device storage cells, such as cells 60 and 65, may be found in the hereinabove mentioned U.S. Pat. No. 3,387,286.

In the operation of the circuit illustrated in FIG. 1 of the drawing, let it be assumed that cell 60 connected to bit line 58 is to be read out and the information restored into cell 60. Let it be assumed further that cell 60 has a 1 bit of information stored therein which is represented by a positive voltage or charge on cell capacitor 108.

Figure 2:
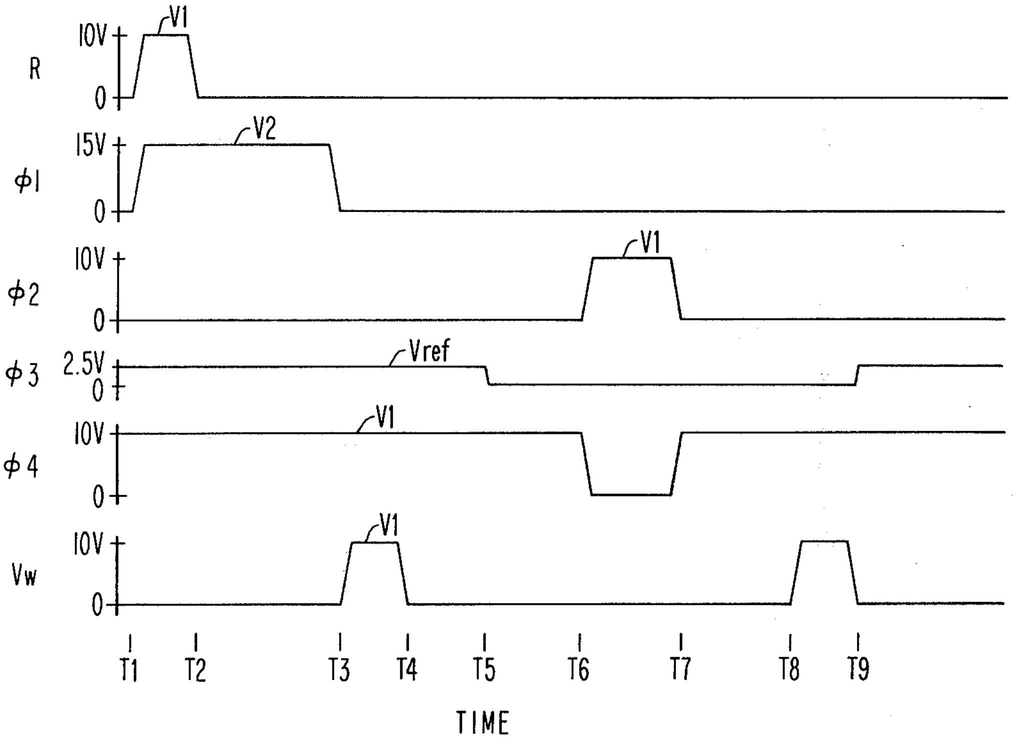

At the time T*l*, as indicated in FIG. 2 of the drawing, a positive pulse from clock pulse source $\phi 1$ is applied to the gate electrodes 40 and 52 of transistors 38 and 50, respectively, to apply the voltage V*l* to the gate electrodes 34 and 46 of transistors 32 and 44, respectively. The voltage V*l* on gate electrode 34 charges capacitor 36 until the current through transistor 32 of controlled current source 16 equals the current in transistor 20 and the voltage V*l* on gate electrode 46 charges capacitor 48 until the current through transistor 44 of controlled current source 18 equals the current through transistor 22. After clock pulse $\phi 1$ goes to ground transistors 38 and 50 are turned off, thus trapping charge on capacitors 36 and 48 and providing substantially the same voltage at common points 28 and 30. The circuit is now prepared to receive an input signal such as a DC differential signal from bit lines 58 and 64 applied to gate electrodes 56 and 62. The input signal applied to the gate electrodes 56 and 62 alters the current in transistors 20 and 22. Since the gate to source voltages of transistors 32 and 44 are fixed by the charge placed on capacitors 36 and 48, respectively, the current through transistors 32 and 44 does not change even though the current through transistors 20 and 22 has been changed by the input signal. The difference in current passing through transistors 20 and 22 produces a differential output voltage between common points 28 and 30 as described in the hereinabove identified commonly assigned application having Ser. No. 426,845.

At the time T1, clock pulse $\phi 1$ also charges gate electrodes 68 and 76 of transistors 66 and 74 to voltage V*ref* while restore pulse R is applied to gate electrodes 92 and 100 of transistors 90 and 98 to charge the bit line capacitance 114 and 124 to voltage V*ref*. Clock pulse $\phi 3$ is applied to a current carrying electrode of transistors 66 and 74 and clock pulse $\phi 4$ is turned on to connect the bit lines 58 and 64 to gate electrodes 56 and 62 of transistors 20 and 22. When at time T3 pulse V*w* is turned on, the charge on storage capacitor 108, which is storing a 1 bit of information, is applied to bit line 58 through transistor 106 to increase the voltage on bit line 58 to a higher positive value than V*ref*. Since the voltage on bit line 64 is only at V*ref*, the current through transistor 20 increases and the current through transistor 22 decreases causing a decrease in the voltage at common point 28 and an increase in voltage at common point 30 and, thus, corresponding voltages occur at gate electrodes 68 and 76 of transistors 66 and 74. When at time T5, clock pulse $\phi 3$ goes to ground, transistor 74 has the larger drive voltage than transistor 66. Therefore bit line 64 discharges at a faster rate than bit line 58, increasing the differential signal on gate electrodes 56 and 62. This increased differential signal is amplified and as described above appears on gate electrode 68 and 76. Due to the positive feedback, the feedback circuits 42 and 54 cause the circuit to latch up. Consequently, transistor 66 is substantially turned off, leaving bit line 58 at approximately V*ref*, whereas transistor 74 is turned on hard, discharging bit line 64 to ground.

At time T6 clock pulse $\phi 4$ goes to ground turning off transistors 82 and 84 to isolate bit lines 58 and 64 from gate electrode 56 and 62 of transistors 20 and 22. Clock pulse $\phi 2$ is applied at time T6 to gate electrode 96 and 104 of transistors 94 and 102 to charge the bit lines 58 and 64 to a voltage of approximately V*l*. When at time T7 clock pulse $\phi 4$ is again applied to transistors 82 and 84, bit line 64 discharges through transistor 74 to ground, due to the latched state of the amplifier, while the charge remains on bit line 58. Between times T8 and T9, word pulse V*w* is again applied to gate electrode 110 to turn on transistor 106 and return charge to capacitor 108 restoring the 1 bit of information.

If a 0 bit of information had been stored in cell 60, i. e., capacitor 108 being uncharged, at time T3 when V*w* was applied to transistor 106 of cell 60, the voltage on bit line 58 would have decreased rather than increased. Consequently, the voltage at common point 28 would have increased and the voltage at common point 30 would have decreased resulting in transistor 66 being turned on to discharge bit line 58 to ground in the latched state, with transistor 74 being turned off leaving bit line 64 approximately at V*ref*. If a cell, such as cell 65, on bit line 64 had been selected by applying word pulse V*wl* to gate electrode 120 of transistor 116, the amplifier would have operated in a similar manner to that described in connection with the selection of cells on bit line 58. New information may be written into any of the cells of the memory array by appropriate selection and energization f bit and word lines, as is well known in the art.

In one of the amplifiers of the present invention which was constructed and satisfactorily operated, voltages used were those indicated in FIG. 2 of the drawing. Additionally, a current Io through constant current source 14 had a magnitude of 40 microamperes with the field effect transistors 20, 22, 32, and 44 operating in their saturation region. The gain of the amplifier was found to be 20 to 30 with input signals detectable from approximately 20 millivolts to a maximum voltage limited, of course, by the electrical limitations of the field effect transistors employed in the amplifier of the invention. The output voltage can be increased, if desired, by increasing the size of capacitors 36 and 48. Furthermore, the transient response of the circuit is improved by minimizing stray capacitances in the amplifier. If more improved transient response is required, Io of constant current source 14 can be increased. Care should also be exercised, for optimum operation, that transistors 20, 22, 32 and 44 be operated in the saturation region.

Accordingly, it can be seen that an amplifier, simple in construction and without requiring large field effect transistors, has been provided in accordance with this invention which can detect very small input signals yet provide a gain of from 20 to 30. The small input signals may have a magnitude of one-tenth that of the smallest magnitude of input signals which are detectable by the cross-couple field effect transistor type referred to hereinabove. Furthermore, the layout of this amplifier is extremely efficient in one-device memory applications where the bit line pitch is extremely small.

While the invention has been particularly shown and described with reference to a preferred embodiment thereof, it will be understood by those skilled in the art that various changes in form and details may be made therein without departing from the spirit and scope of the invention.

What is claimed is:

1. A sensing circuit comprising a differential amplifier having means for receiving differential input signals and means for producing differential output signals, and an alternating current coupled feedback circuit including means for providing a latched operation coupled from said output signals producing means to said input signals receiving means, said latched operation providing means including a control device having a control electrode, means for applying a predetermined bias signal to said control electrode and means for isolating the bias signal from said output signals producing means.

2. A sensing circuit as set forth in claim 1 wherein said feedback circuit includes a voltage source means and said control device couples said voltage source means to said input signals receiving means.

3. A sensing circuit as set forth in claim 2 wherein said control device includes a field effect transistor, said control electrode is a gate electrode and said bias signal isolating means is a capacitor.

4. A sensing circuit as set forth in claim 2 wherein said voltage source means provides a voltage of predetermined magnitude during a first periodic interval and a substantially zero voltage during a second periodic interval.

5. A sensing circuit as set forth in claim 4 further including means for producing signals in memory cells, means for periodically applying said memory cell signals to said input signals receiving means and means coupled to said input signals receiving means for restoring said memory cell signals into said memory cells during said second periodic interval.

6. An amplifier comprising first and second controlled current sources having first and second terminals, said first terminals having a common fixed potential, first and second input dependent current sources each having an input electrode, a constant current source coupled through said first input dependent current source to the second terminal of said first controlled current source and through said second input dependent current source to the second terminal of said second controlled current source, first and second alternating current coupled feedback circuits coupled between the second terminal of said first and second controlled current sources and the input electrode of said first and second input dependent current sources, and means for applying differential signals to said input dependent current sources.

7. An amplifier as set forth in claim 6 wherein each of said feedback circuits includes means for providing a voltage, a transistor, having a control electrode, coupling said voltage providing means to said signals applying means and means coupled to said second terminal of said first and second controlled current sources for applying an alternating current signal to said control electrode to set said amplifier in a latched state.

8. An amplifier as set forth in claim 7 wherein said voltage providing means applies voltage to said transistor during first predetermined periods and means for applying a bias voltage to said control electrodes.

9. An amplifier as set forth in claim 8 wherein said voltage providing means provides a substantially zero voltage at second predetermined periods.

10. An amplifier as set forth in claim 9 wherein said means for applying differential signals includes memory cells and bit lines coupling said memory cells to said input dependent current sources.

11. Amplifier amplifier as set forth in claim 10 further including means coupled to said signals apply means for restoring said signals into said cells during said second predetermined periods.

12. An amplifier as set forth in claim 7 wherein said transistor is a field effect transistor and said control electrode is a gate electrode and said alternating current signal applying means is a capacitor.

13. An amplifier as set forth in claim 12 wherein said input dependent current sources are first and second transistors having control electrodes and said signals applying means is connected to said electrodes.

14. An amplifier as set forth in claim 13 wherein said first and second transistors are field effect transistors and said control electrodes are gate electrodes.

15. An amplifier as set forth in claim 13 wherein said controlled current sources include third and fourth transistors having control electrodes and means for applying predetermined fixed voltages to the control electrodes of said third and fourth transistors.

16. An amplifiers as set forth in claim 15 wherein said third and fourth transistors are field effect transistors having source electrodes, said control electrodes are gate electrodes and said voltages applying means includes first and second charged capacitors connected between the gate and source electrodes of said third and fourth transistors, respectively.

17. A sensing circuit comprising a constant current sink, a constant voltage source, first and second serially connected transistors coupling said constant voltage source to said constant current sink, said second transistor being interposed between said first transistor and said constant current sink, each of said transistors having a gate electrode, third and fourth serially connected transistors coupling said constant voltage source to said constant current sink, said fourth transistor being interposed between said third transistor and said constant current sink, said third and fourth transistors having gate electrodes, a first alternating current feedback circuit coupled to the common point between said first and second transistors, a second alternating current feedback circuit coupled to the common point between said third and fourth transistors, a first capacitor connected between the gate electrode of said first transistor and the common point between said first and second transistors, a second capacitor connected between the gate electrode of said third transistor and the common point between said third and fourth transistors, means coupled to the gate electrodes of said first and third transistors for periodically charging said first and second capacitors, and means for applying a differential input signal between the gate electrodes of said second and fourth transistors, each of said first and second feedback circuits including a voltage source, a field effect transistor, having a gate electrode, coupling said voltage source to said input signals applying means and a capacitor coupled between one of said common points and the gate electrode of said field effect transistor and means for applying a bias voltage to the gate electrode of said field effect transistors.

* * * * *